April 26, 1932.  H. A. SHAW  1,855,492
DECORATING BAR AND MEANS OF SECUREMENT
Filed July 30, 1931
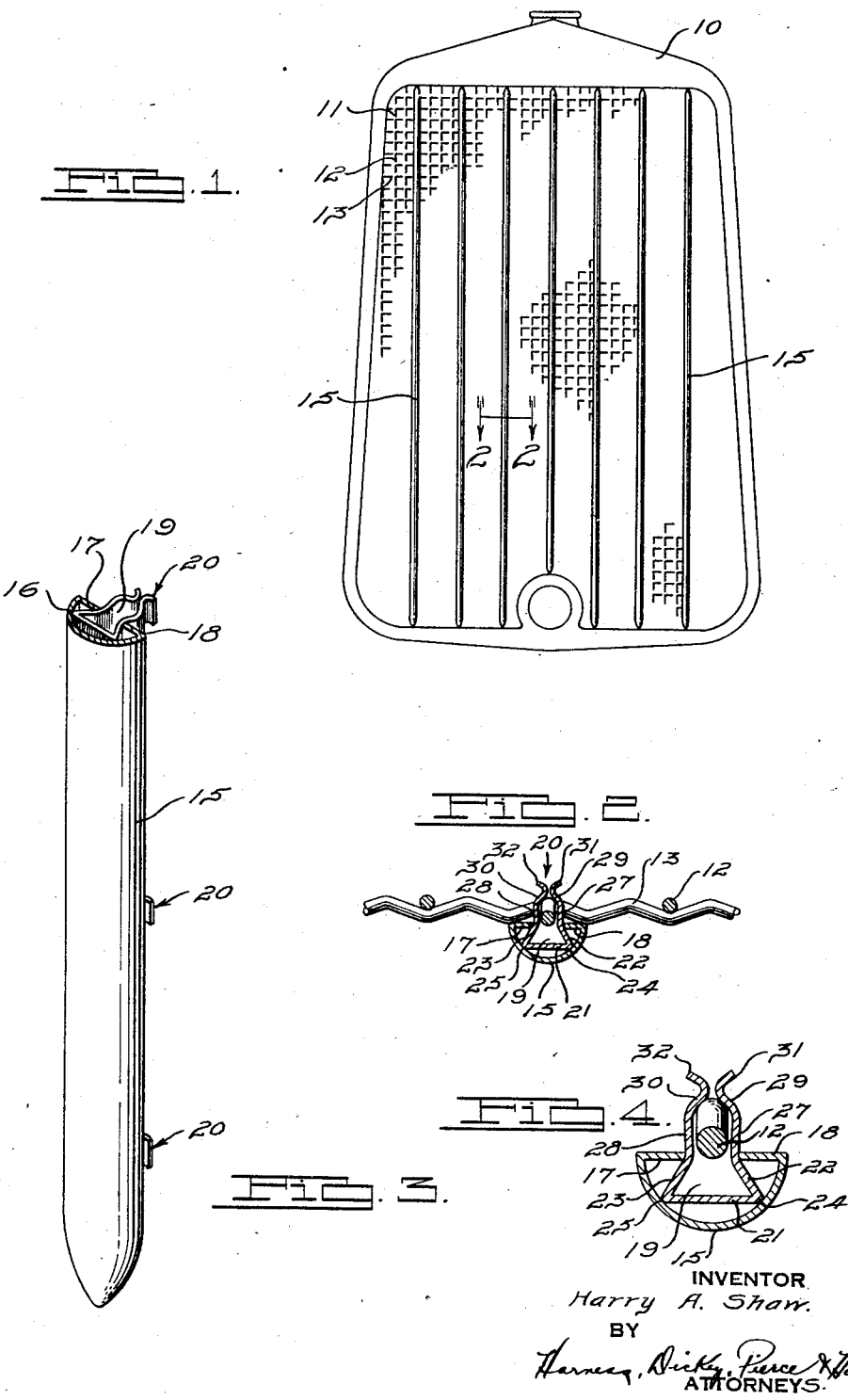
INVENTOR
Harry A. Shaw.
BY
ATTORNEYS.

Patented Apr. 26, 1932

1,855,492

UNITED STATES PATENT OFFICE

HARRY A. SHAW, OF EAST LANSING, MICHIGAN, ASSIGNOR TO REO MOTOR CAR COMPANY, OF LANSING, MICHIGAN, A CORPORATION OF MICHIGAN

DECORATING BAR AND MEANS OF SECUREMENT

Application filed July 30, 1931. Serial No. 553,999.

The invention relates to decorative devices and is particularly adaptable for use in connection with screens such as, for instance, the screens for the radiators of motor vehicles.

The principal objects of the invention are to provide a decorative bar which can easily be secured to a support and retained thereon in a constantly tight-fitting manner; to provide a decorative bar having fastening means, which permits securing the bar to supports of various sizes; to provide a bar of the character which can readily be secured to screens, and particularly radiator screens, of various mesh and wire dimensions; and to provide releasable fastening means for this purpose which constantly maintain the bar in position and prevent undesirable movement or loosening in the connection.

For a better understanding of the invention, reference may be had to the accompanying drawings forming a part of the specification, wherein:

Fig. 1 is a front end view of a motor vehicle radiator having decorative bars applied thereto which are constructed according to one form of the invention;

Fig. 2 is a cross-sectional view on a larger scale, taken substantially along line 2—2 of Fig. 1;

Fig. 3 is an elevational view partly in cross section, illustrating one of the decorative bars and fastening clips associated with the bar for securing it to the radiator screen;

Fig. 4 is a fragmentary cross-sectional view, similar to that shown by Fig. 2 but taken on a larger scale, illustrating the particular manner in which the fastening clips cooperate with wires of the screen for constantly urging the decorative bar toward the screen.

Referring to Fig. 1, a radiator shell 10 is illustrated which is provided with a screen 11. The screen is composed of interwoven wires 12 and 13, and each of the wires is of undulating character as shown particularly by Fig. 2. Vertically arranged decorative bars 15 are disposed in front of the screen 11 for enhancing the appearance of the radiator, and the construction of these bars and the manner of securing them to the screen will now be described.

Referring to Fig. 3, each of the bars 15 is substantially semi-cylindrical in shape in cross section, as indicated at 16, and preferably is composed of sheet metal having a high polish on its exterior surface. At opposite edges, the bar is provided with inwardly directed or radial flanges indicated at 17 and 18 and the adjacent edges of the flanges are spaced to provide a longitudinally extending slot 19 in that side of the bar defined by the flanges.

As best shown by Fig. 3, a plurality of clips 20 are associated with each of the bars 15 for the purpose of securing the latter to the screen 11. Each of the clips as best shown by Fig. 2 comprises a base portion 21 provided at its end with flange portions 22 and 23 projecting in the same direction in slightly converging relation. These portions of the clips are disposed within the walls of the bar 15, and the junction of the flange portions 22 and 23 with the base 21, as indicated at 24 and 25, preferably engage the inner curved surface of the bar. The converging flange portions 22 and 23 extend through the space or slot 19 between the radial flanges 17 and 18 on the bar, and then merge with portions 27 and 28 directed substantially in parallel relation and substantially perpendicular to the base 21 of the clip. The portions 27 and 28 are disposed exteriorly of the bar 15, and at their outer ends terminate in converging and inclined portions 29 and 30, respectively. Such inclined portions 29 and 30 in turn terminate in reversely bent portions 31 and 32 which flare outwardly in diverging relation for facilitating the entry of a wire between the sides of the clip.

When one of the bars 15 has been separated from the screen, the sides of the clip move toward each other by reason of inherent spring resiliency of the metal of which the clip is composed, and this causes the sides of the clip to move away from the adjacent edges of the flanges 17 and 18 of the bar. Under such circumstances, the clip may be slidably moved longitudinally of the bar 15 into any position desired. When a bar is associated with the screen 11, it is aligned with one of the wires 12 and then the bar is moved toward the screen until the wire 12 moves between the sides of the clips, and into a position between the sides of the clip between the inclined portions 29 and 30. Particularly in view of the fact that the wire is of undulating character, it will contact with the converging portions 29 and 30 of the clip in the manner shown by Fig. 4, and this arrangement results in such inclined portions of the clip constantly urging the wire toward the bar 15. In other words, the bar is urged toward and against the screen and the side edges thereof normally will be urged into contact with the wires 13 extending transversely of the wires 12, thereby insuring the prevention of loose connections and avoiding noises which would otherwise occur if the bar were loose. Attention is also directed to the fact that when the sides of the clip are expanded by the wire therebetween, the outer sides of the clip will engage the adjacent edges of the flange portions 17 and 18 of the bar 15 and in conjunction with the contact between the clip and the inner cylindrical surface of the bar, will firmly bind the clip against longitudinal movement with respect to the bar.

It is apparent from the foregoing description, that a bar is provided which may be readily associated with a radiator screen or the like and positively maintained in position. It is likewise apparent that looseness in the connection between the bar and screen is prevented by a constant urging of the bar toward the screen by the engagement between the clips and the vertical wires of the screen. It is also apparent that the bar may be easily removed merely by pulling outwardly on it and that any number of bars may readily be associated with the screen. Moreover, longitudinal or vertical movement of the bar with respect to the screen is positively prevented by the binding engagement between the clips and the bar resulting from the expansion of the sides of the clips by the wire therebetween. Bars of this construction may easily be manufactured and the clips associated therewith readily by longitudinally telescoping the clips with respect to the bar, and ordinarily such clips will be so associated with the bar and then the ends of the bar will be formed to provide converging portions to enhance the appearance thereof. It is apparent that the clips are adaptable for connection with screens of various mesh and likewise that they are adapted for engagement with different sizes of wires or other supporting elements. While the decorative bar has been shown as applied to a radiator screen, it should be understood that it also can be applied to other elements in an equally efficient manner.

Although only one form of the invention has been illustrated and described in detail, it will be apparent to those skilled in the art that various modifications may be made without departing from the scope of the appended claims.

I claim:

1. The combination with a screen comprising wires disposed in criss-cross relation, of a decorative bar connected to certain of the wires, said connection including means for constantly urging the bar toward the screen.

2. The combination with a support, of a decorative bar, and means for securing the bar to the support including means for constantly urging the bar toward the support.

3. The combination with a screen comprising wires disposed in criss-cross relation, of a decorative bar releasably connected to the screen, said connection including means for constantly urging the bar toward the screen.

4. The combination with a screen comprising wires disposed in criss-cross relation, of a decorative bar connected to the screen, said connection including means for constantly urging the bar toward the screen.

5. The combination of a screen comprising criss-crossed wires of undulating character, of a decorative bar connected to certain of the wires, said connection including means for constantly urging the bar toward the screen.

6. An article of manufacture comprising a bar having clips associated therewith, each of the clips comprising lips normally urged toward each other, whereby a wire or similar element disposed between the lips will be resiliently engaged thereby and the wire retained associated with the bar.

7. An article of manufacture comprising a bar having clips associated therewith, each of the clips comprising lips having converging portions normally urged toward each other.

8. An article of manufacture comprising a bar having an undercut opening therein, a clip disposed in such opening and normally retained therein by the undercut portion of the bar defining the opening.

9. An article of manufacture comprising a bar having an undercut opening therein, a clip disposed in the opening and normally retained therein by the undercut portion of the bar defining the opening, said clip having outwardly projecting portions adapted to engage a wire or similar element for retaining the latter associated with the bar.

10. The combination with a screen comprising wires disposed in criss-cross relation, of a decorative bar having an undercut groove, clips disposed in the groove and normally retained therein by the undercut portions of the bar defining the groove, said clips having outwardly projecting lips normally urged toward each other, said lips being adapted to obtain a wire of the screen therebetween.

11. The combination with a screen comprising wires disposed in criss-cross relation, of a decorative bar having an undercut groove therein, clips disposed in the groove and having lip portions projecting exterially of the groove, said lip portions having converging parts normally urged toward each other, whereby a wire of the screen disposed between the lips and converging parts thereof, will be retained associated with the bar, and normally urged toward the bar.

12. The combination with a screen comprising wires disposed in criss-cross relation, of a decorative bar having an undercut groove therein, clips disposed in the groove and having lip portions projecting exterially thereof, said lips normally being urged toward each other whereby a wire of the screen disposed between the lips will be engaged thereby for retaining the wire associated with the bar, said lips being so arranged and constructed with respect to the bar that when the lips are expanded by the wire being disposed between them, they will be urged into binding relation with portions of the bar.

13. The combination with a screen comprising wires disposed in criss-cross relation, of a decorative bar adapted to be secured to the screen, said bar having an undercut groove therein, clips disposed in the groove and normally slidably longitudinally thereof, said clips having lips projecting exterially of the groove which are normally urged toward each other, the lips having converging portions adapted to engage opposite sides of one of the wires for retaining the wire associated with the bar and for normally urging the bar and wire toward each other.

14. The combination with a screen comprising wires disposed in criss-cross relation, of a decorative bar having an undercut groove therein, fastening means disposed in the groove for securing the bar to the screen, said fastening means being normally movable longitudinally of the groove in the bar but being so constructed and arranged with respect to the bar that upon securing the screen to the bar, the fastening means, are forced into binding relation with the bar and prevented from longitudinal movement in the groove.

15. The combination with a wire or similar support, of a decorative bar, and means longitudinally adjustable of the bar, releasably securing it to the support.

16. The combination with a wire or similar support, of a decorative bar having clips longitudinally adjustable thereon, and engaging the support to hold the bar in place.

HARRY A. SHAW.